J. P. HORNER.
COTTON BLOCKING ATTACHMENT.
APPLICATION FILED MAY 14, 1910.
978,751.
Patented Dec. 13, 1910.
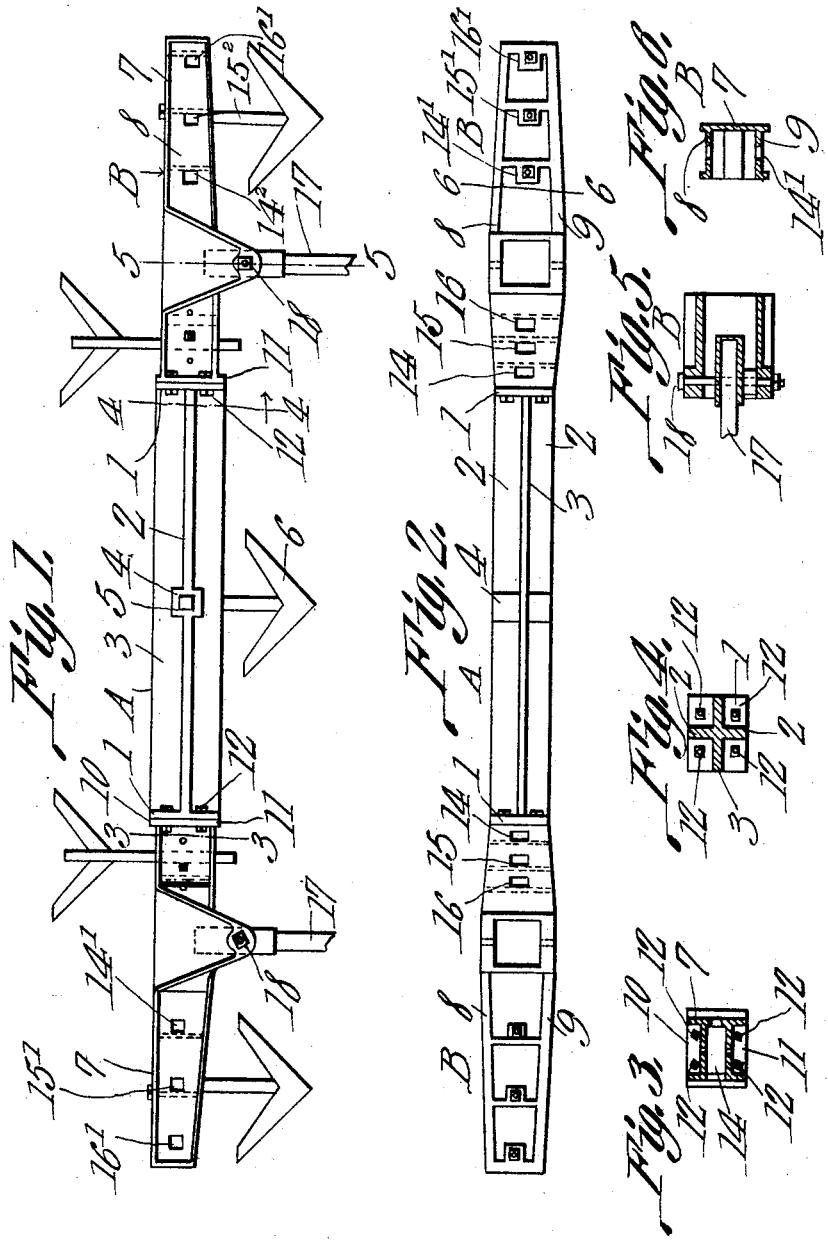
Witnesses
John P. Horner,
Inventor
by C. A. Snow & Co.
Attorneys

UNITED STATES PATENT OFFICE.

JOHN P. HORNER, OF LOCKHART, TEXAS.

COTTON-BLOCKING ATTACHMENT.

978,751.  Specification of Letters Patent.  Patented Dec. 13, 1910.

Application filed May 14, 1910. Serial No. 561,437.

*To all whom it may concern:*

Be it known that I, JOHN P. HORNER, a citizen of the United States, residing at Lockhart, in the county of Caldwell and State of Texas, have invented a new and useful Cotton-Blocking Attachment, of which the following is a specification.

This invention relates to cotton blocking attachments for cultivators.

The object of the invention is to improve the construction of the cotton blocking attachment forming the subject matter of United States Letters Patent No. 949795 issued to me on February 22nd, 1910.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claim without departing from the spirit of the invention.

In the accompanying drawings forming part of this specification Figure 1 is a plan view of a cotton blocking attachment constructed in accordance with the present invention. Fig. 2 is a front elevation thereof with the cultivator beam and sweep or cutter heads omitted. Fig. 3 is a section on the line 3—3 of Fig. 1. Fig. 4 is a section on the line 4—4 of Fig. 1. Fig. 5 is a section on the line 5—5 of Fig. 1. Fig. 6 is a section on the line 6—6 of Fig. 2.

Like reference numerals indicate corresponding parts in the different figures of the drawing.

The cotton blocker attachment of the present invention comprises a bar or head which preferably is formed with a center section indicated generally by the reference letter A and two outer or end sections indicated generally by the reference letter B—B. The center section A preferably is in the form of an equilateral cross in cross section as illustrated in Fig. 4 and at the ends thereof said section is formed with angular or square plates 1, said plates being preferably formed integral with the flanges 2 and 3 of the section. Adjacent its center the vertically extending flange 2 of the inner section A is enlarged as indicated at 4 and formed with an opening to receive the shank 5 of a cutter or sweep 6. The shank receiving opening of the inner section 4 is arranged midway between the ends thereof.

Each of the outer sections B is formed with a rear plate 7 from which extends forwardly a pair of parallel flanges 8 and 9. At the inner end thereof each section B is formed with upwardly and downwardly extending flanges 10 and 11 which are bolted as indicated at 12 to the outer plate 1 of the inner section A, the nuts of the bolts 12 being arranged on the inside of the plates 1 so as to be readily accessible for the purpose of detaching either of the outer sections in the event that it becomes broken by tipping or otherwise. Each of the outer sections B is formed with an intermediate set of openings 14, 15 and 16, as well as with an outer set or series of openings 14', 15' and 16'. The opening 14 of the intermediate set is half way between the opening 14' and the middle opening 4. The opening 15 is midway between the opening 15' and the inner opening 4. The opening 16 is midway between the opening 16' and the inner opening 4. This arrangement of the openings permits the cultivator to be adjusted to block out different sizes of rows. By placing the outer and intermediate sets of openings in the outer and detachable sections B, said sections can not only be removed and replaced whenever broken, but if it should be desired to alter the sizes of the sections or the arrangements of the openings, new sections with different distances between the openings can be secured in place without necessitating any alteration or change in the middle section.

The cultivator beams 17 are pivotally connected at 18 with the cotton blocking attachment.

The outer series of openings 14', 15' and 16' preferably are arranged at a right angle to the intermediate set of openings 14, 15 and 16, in order to accommodate the different sweeps as illustrated in Fig. 1, the shanks of the intermediate sweeps being provided with horizontally extending upper ends and the shanks of the outer sweeps being provided with vertically extending upper ends.

The cotton blocking attachment of the present invention is strong, simple, durable and inexpensive in construction as well as thoroughly practical and efficient in use. In the event that the end of the bar becomes broken by reason of the tipping of the same or for any other cause, the broken section can be immediately detached and a new section substituted without otherwise changing the bar.

What is claimed as new is:—

A cotton blocking attachment formed in three sections, the inner section being of equilateral cross shape in cross section and having end plates, and the outer section having end plates secured to the end plates of the inner section, said inner section having a shank opening and each of said outer sections having a plurality of sets of shank openings.

In testimony that I claim the foregoing as my own, I have hereto affixed my signature in the presence of two witnesses.

JOHN P. HORNER.

Witnesses:
J. W. HARTSFIELD,
TOM F. HARRIS.